US006568559B2

(12) United States Patent
Miller et al.

(10) Patent No.: US 6,568,559 B2
(45) Date of Patent: May 27, 2003

(54) TERMITE CONTROL SYSTEM WITH MULTI-FLUID PROPORTION METERING AND BATCH SIGNAL METERING

(75) Inventors: Michelle Jean Miller, Plymouth, MN (US); Kenneth Eugene Lehrke, Maple Grove, MN (US); Scott Cameron Losey, Edina, MN (US)

(73) Assignee: Wanner Engineering, Inc., Minneapolis, MN (US)

( * ) Notice: Subject to any disclaimer, the term of this patent is extended or adjusted under 35 U.S.C. 154(b) by 0 days.

(21) Appl. No.: 09/731,405

(22) Filed: Dec. 6, 2000

(65) Prior Publication Data

US 2003/0071062 A1 Apr. 17, 2003

Related U.S. Application Data

(60) Provisional application No. 60/252,998, filed on Nov. 24, 2000.

(51) Int. Cl.⁷ .................................................. B67D 5/16
(52) U.S. Cl. ............................... 222/1; 222/57; 222/63
(58) Field of Search ................................. 222/1, 57, 63

(56) References Cited

U.S. PATENT DOCUMENTS

| | | | |
|---|---|---|---|
| 2,367,135 A | | 1/1945 | Moon et al. |
| 3,770,060 A | | 11/1973 | Forsyth et al. |
| 3,831,849 A | | 8/1974 | Studinger |
| 3,910,497 A | | 10/1975 | Manor |
| 4,236,673 A | | 12/1980 | Lake |
| 4,341,327 A | * | 7/1982 | Zeitz ........................ 222/135 |
| 4,427,298 A | * | 1/1984 | Fahy et al. ............ 137/624.18 |
| 4,487,333 A | * | 12/1984 | Pounder et al. .......... 222/129.4 |
| 4,593,855 A | | 6/1986 | Forsyth |
| 4,609,149 A | | 9/1986 | Jessen |
| 4,638,924 A | * | 1/1987 | Newsom ........................ 222/1 |
| 4,821,958 A | | 4/1989 | Shaffer |
| 5,100,058 A | | 3/1992 | Wei |
| 5,118,008 A | * | 6/1992 | Williams ........................ 222/1 |
| 5,180,108 A | | 1/1993 | Miyamoto |
| 5,255,819 A | * | 10/1993 | Peckels ........................ 222/1 |
| 5,303,866 A | | 4/1994 | Hawks, Jr. |
| 5,368,059 A | | 11/1994 | Box et al. |
| 5,383,605 A | | 1/1995 | Teague |
| 5,636,648 A | | 6/1997 | O'Brien et al. |
| 6,164,560 A | | 12/2000 | Lehrke et al. |

FOREIGN PATENT DOCUMENTS

EP          0 116 879          8/1984

OTHER PUBLICATIONS

Motorola Analog IC Device Data, Model MC33035.
Injecto–Matic Single Button Flow Meter Instructions.
Flowmaster PHL–HP Electronic Digital Flowmeter Operating Manual (one page).
Josof, 'Super Charging Terminex,' PCT Pest Control Technology, Mar. 1998.

* cited by examiner

Primary Examiner—Kenneth Bomberg
(74) Attorney, Agent, or Firm—Merchant & Gould P.C.

(57) ABSTRACT

The invention provides a system and method for proportion metering multiple fluids together that are output from different pumps. The invention further provides a system and method for batch signal metering that provides feedback on the amount of fluid that has been dispensed. The invention has applications in numerous technologies, including metering together pest control fluids, such as those used for termite control; metering lawn care fluids such as herbicide and fertilizer; blending colors used in dyes, paints and the like; personal care products such as lotions; water treatment; and other technologies in which different fluids are pumped by separate pumps and thereafter mixed together downstream of the pumps prior to being dispensed.

19 Claims, 15 Drawing Sheets

TERMITE CONTROL SYSTEM WITH MULTI-FLUID PROPORTION METERING AND BATCH SIGNAL METERING

This application claims the benefit of U.S. Provisional Application No. 60/252,998, filed Nov. 24, 2000.

FIELD OF THE INVENTION

The invention relates to metering multiple fluids together. More particularly, the invention relates to a system and method for proportion metering multiple fluids together that are output from different pumps. The invention further relates to a system for batch signal metering that provides feedback on the amount of fluid that has been dispensed. The invention has applications in numerous technologies, including metering together pest control fluid, such as those used for termite control; metering lawn care fluids such as herbicide and fertilizer; blending colors used in dyes, paints and the like; personal care products such as lotions; water treatment; and other technologies in which different fluids are pumped by separate pumps and thereafter mixed together downstream of the pumps prior to being dispensed.

BACKGROUND OF THE INVENTION

In the pest control industry today, termite control is achieved by injecting a mixture of water and one or more termiticide chemicals into spaced application holes or application areas. The most common proportioning method currently employed is to premix the water and termiticide in a large tank, with the mixture being pumped from the tank through an injection gun into the appropriate location. While relatively simple, an issue that arises is getting the correct proportion of water and termiticide mixed in the tank. This is difficult due to the fact that the tank is never completely emptied, so having to add a predetermined amount of termiticide to a predetermined amount of water so that the desired proportion is maintained in the tank becomes a guessing game.

An additional problem is knowing if the proper amount of mixture went into each application hole or into each application area. If it does not, a "bridge" will exist for termites to pass through. One way to measure the amount of mixture injected is to attach a flowmeter to the injection gun. However, the accuracy of flow-meters deteriorates during on-off triggering (i.e. transient) conditions of the injection gun. Accurate measuring of injected mixture is important, particularly when the chemical being injected is potentially harmful to the environment. Moreover, it is often difficult for an operator to keep track of the flowmeter while at the same time handling the application device and performing the tasks of the job.

Another method presently used to proportion water and termiticide is to use the pressure from a water hose to drive a piston reciprocator that in turn drives a metering piston pump for the termiticide. Such a device is supplied under the name "Injecto-matic" by H&H Holdings of Ontario, Canada. The problems with such a device include limited ranges, time required for mechanical adjustments, time for calibration, and time for service.

Perhaps the primary method currently used to proportion meter two or more fluids together is to use master-slave technology for pumps that are used to pump the fluids. One pump is the master, and the other(s) is slaved to its speed at the proper ratio. In a mechanically locked system, this slaving is held very close. But with this type of system, adequate mixing ratio accuracy's can only be maintained up to about 10:1 because of changeover and valving effects. Electronically slaved pumps operated by servo motors have the additional problem of not being able to lock together very well, because the two pump systems will be "tuned" together at only one condition. Therefore, one pump will start and/or stop faster than the other. This happens each time the injection gun is turned on and off, which occurs frequently when injecting into the application holes.

One method to overcome this problem is the sequential metering system disclosed in U.S. Pat. No. 5,368,059. This patent discloses that a first fluid component is pumped in a mini-batch, followed by a second fluid component that is pumped in a mini-batch, followed by the first fluid component, etc. This concept requires specialized mixing devices in order to fully mix the two fluids.

Improvements in proportionally metering multiple fluids together that are output from different pumps would benefit a large number of industries. In addition, more accurate monitoring of dispensed fluids would provide an added benefit.

SUMMARY OF THE INVENTION

The invention provides a system and method for proportion metering multiple fluids together that are output from different pumps. The invention further provides a system and method for batch signal metering that provides feedback on the amount of fluid that has been dispensed. The invention has applications in numerous technologies, including metering together pest control fluids, such as those used for termite control; metering lawn care fluids such as herbicide and fertilizer; blending colors used in dyes, paints and the like; personal care products such as lotions; water treatment; and other technologies in which different fluids are pumped by separate pumps and thereafter mixed together downstream of the pumps prior to being dispensed.

In one aspect of the invention, a method of proportion metering first and second fluids is provided. The fluids are output from first and second pumps, respectively, over a continuous series of proportioning cycles to achieve a selected mix ratio. The method comprises: a) simultaneously operating the first and second pumps; b) monitoring the amounts of the first and second fluids output by the first and second pumps during each proportioning cycle, respectively; c) stopping the first pump while the second pump continues operating until the selected mix ratio is achieved for a current proportioning cycle, and then restarting the first pump to begin the next proportioning cycle; and d) continuously repeating step c) on a periodic basis.

In yet another aspect of the invention, a method of proportion metering first and second fluids output from first and second pumps to achieve a predetermined mix ratio is provided. The method comprises repeatedly pumping the first and second fluids in discrete batches through simultaneous operation of the first and second pumps, the ratio of the volumes of the first and second fluids in each batch equaling the predetermined mix ratio.

In another aspect of the invention, a method of controlling first and second pumps that output first and second fluids, respectively, in order to blend the first and second fluids in a selected mix ratio is provided. The method comprises simultaneously operating the first and second pumps over a series of repeating proportioning cycles to output the first and second fluids; monitoring the amounts of the first and second fluids output by the first and second pumps during each proportioning cycle; stopping operation of the first pump in each proportioning cycle while the second pump continues to operate, operation of the first pump being stopped each time the first pump outputs a selected amount of the first fluid; and restarting the first pump once the second pump has output enough of the second fluid in a current proportioning cycle to achieve the selected mix ratio.

In another aspect of the invention, a system for proportion metering fluids, comprises first and second pumps for pumping first and second fluids, respectively. Each pump includes a drive motor, and the fluid displacement of the first pump is less than the fluid displacement of the second pump. A sensor associated with each drive motor senses revolutions of each pump. Control circuitry is provided for determining the amounts of the first and second fluids output by the first and second pumps based upon the sensed revolutions during a series of repeating proportioning cycles. The control circuitry is designed to stop operation of the first pump when a predetermined amount of the first fluid has been output in each proportioning cycle. The control circuitry is further designed to restart operation of the first pump to begin the next proportioning cycle when the second pump outputs enough of the second fluid to achieve a desired mix ratio between the first and second fluids in each proportioning cycle.

In yet another aspect of the invention, a method of tracking the amount of fluid dispensed from a fluid dispensing system is provided. The method comprises selecting an incremental amount of fluid that is less than a total amount of fluid to be dispensed; electronically monitoring the amount of fluid being dispensed during dispensing; and electronically generating a sensory signal each time that the amount of fluid dispensed equals the incremental amount of fluid.

In yet another aspect of the invention, a system for tracking amounts of fluid dispensed from a fluid dispenser comprises means for selecting an incremental amount of fluid that is less than a total amount of fluid to be dispensed from the fluid dispenser, means for electronically monitoring the amount of fluid being dispensed from the fluid dispenser during dispensing; and means for electronically generating a sensory signal each time that the amount of fluid dispensed from the fluid dispenser equals the incremental amount of fluid.

An additional aspect of the invention provides a termite control system for use on a vehicle. The system includes a module mountable on the vehicle, with the module including first and second tanks containing first and second fluids, and first and second pumps having inlets connected to the first and second tanks, respectively, and outlets connected to an injection gun. A control system controls operation of the first and second pumps, with the control system permitting simultaneous operation of the first and second pumps, and where the first and second fluids are output from the injection gun as a mixture with a predetermined mix ratio.

Another aspect of the invention provides an assembly that is associated with a tailgate of a pickup truck for extending the box of the pickup truck. The assembly includes a rear panel that is pivotally connected at a first edge thereof to the tailgate whereby the rear panel is pivotable relative to the tailgate between a position generally perpendicular to the tailgate and a position generally parallel to the tailgate. In addition, the assembly includes first and second side panels pivotally connected at edges thereof to second and third edges of the rear panel whereby the first and second side panels are pivotable relative to the rear panel between positions generally perpendicular to the rear panel and positions generally parallel to the rear panel, and the second and third edges of the rear panel are generally perpendicular to the first edge.

One advantage of the invention is that accurate metering of termiticide and water is achieved to assure correct application per label instructions.

Another advantage is that consistent metering is provided under all conditions by removing the need for operator intervention to pre-mix fluid.

Yet another advantage is that audible batch size indication is provided to enhance the ability of the operator to dispense the correct amounts of fluid in application holes and other blind application situations. In addition, the system displays information concerning current or past jobs, as well as running totals of dispensed fluid amounts.

The invention further reduces chemical waste by up to 15% by mixing on demand, thereby providing consistent use of chemical for each job.

These and various other advantages and features of novelty which characterize the invention are pointed out with particularity in the claims annexed hereto and forming a part hereof. However, for a better understanding of the invention, its advantages and objects attained by its use, reference should be made to the drawings which form a further part hereof, and to the accompanying description, in which there is described a preferred embodiment of the invention.

DETAILED DESCRIPTION OF THE INVENTION

Overview

Before describing the details of the invention, an overview of the broad concepts of the invention will be provided. The invention relates to a termite control system for use in the termite control industry. The system is designed to simplify termite control operations and ensure the integrity of the termite control application process, while using a minimum number of required operator interactions and operations. The system is designed to proportion meter water and termiticide chemical together over a wide range of selectable mix ratios. In the preferred embodiment, the mix ratios range from about 20 parts water to about 1 part termiticide chemical all the way up to about 160 parts water to about 1 part termiticide chemical. The properly proportioned mixture is pumped through a hose to an injection gun where it is injected into the desired application holes or application areas.

The invention is described in relation to its preferred application, a termite control system. However, many systems and subsystems described herein have applications in other industries as well. For instance, the proportion metering concepts described herein have applications in the blending of colors used in dyes, paints and the like; blending components of lotions; water treatment; and other technologies in which different fluids are pumped by separate pumps and thereafter mixed together downstream of the pumps in predetermined mix ratios. Therefore, reference to termite control is for sake of description only, and should not be considered to limit the disclosed concepts to that use only.

Truck and Module

Figure 1:
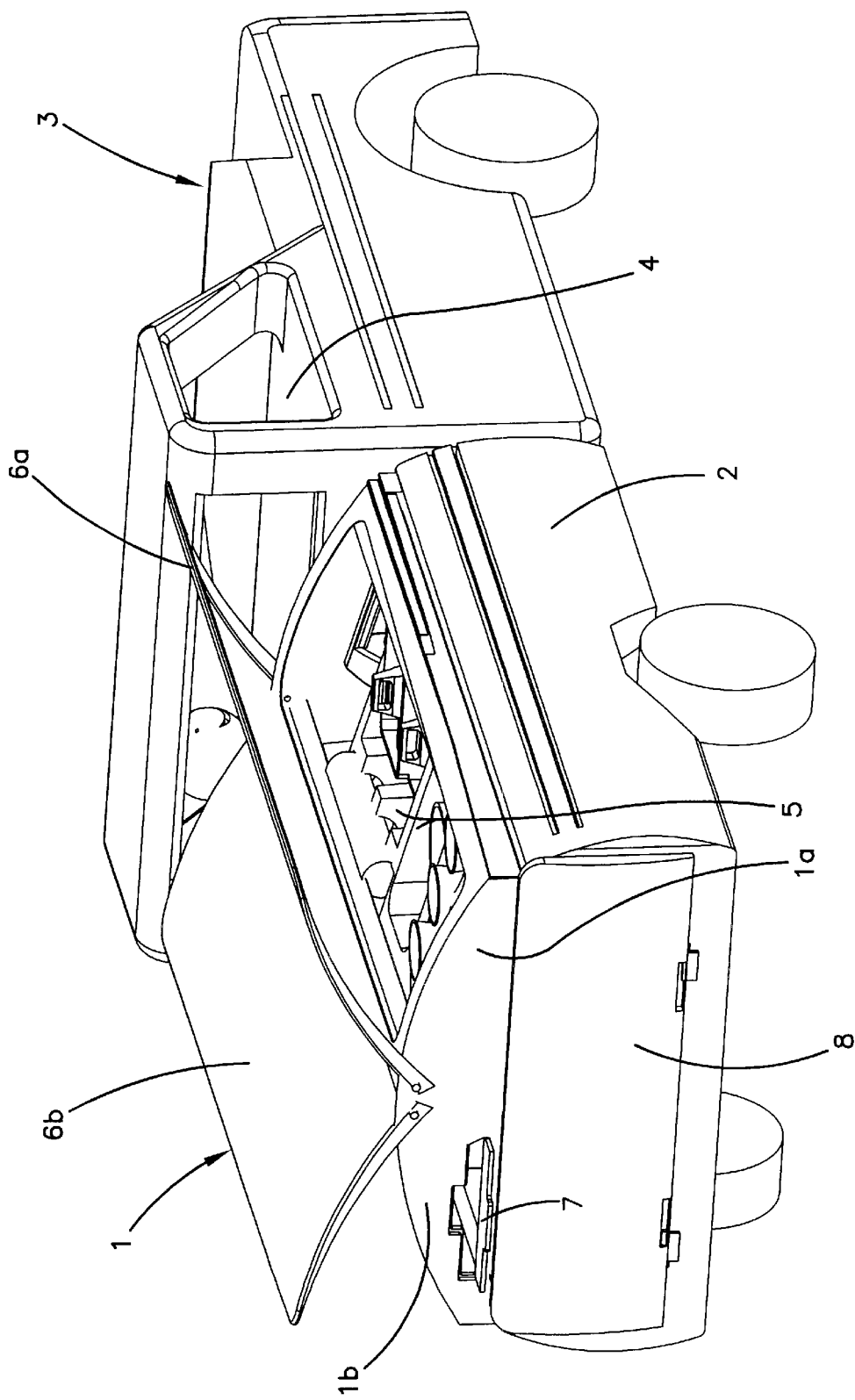
FIG. 1 illustrates the arrangement of a module mounted in the box of a pickup truck.

FIG. 1 illustrates a module 1 forming a part of the termite control system of the invention, with the module 1 mounted in the box 2 of a pickup truck 3. The pickup truck 3 is generally conventional and includes a cab 4 at the front end thereof in which an operator sits to operate the vehicle, with the box 2 extending rearwardly from the cab 4. Although shown and described herein as used on a pickup truck, the module 1 could be designed for use with other vehicles, such as flat-bed utility vehicles.

The module 1 is removably secured within the box 2 of the truck 3. The module 1 includes first and second topper halves 1a, 1b that fit onto the box 2 and cover elements of the fluid dispensing system to be later described. A pair of gull wing doors 6a, 6b are pivotally connected to the topper halves 1a, 1b and pivot between an open position, shown in FIG. 1, allowing access to all components of the fluid dispensing system, and a closed position (not shown) which provides security for the components, tooling, and termiticide fluid of the fluid dispensing system, as well as providing clean line aesthetics.

The module 1 further includes the aforementioned fluid dispensing system that is housed within the topper halves. Included in the fluid dispensing system is a pair of fluid tanks, described below with respect to FIG. 2, that carry termite control fluids necessary to form a termite control mixture. Pumps for pumping the termite control fluids, fluid flow lines, valving, a hose reel assembly and various other components of the termite control system are also part of the fluid dispensing system housed within the topper halves.

The fluid tanks are preferably formed of a molded plastic material. Integrally molded with the fluid tanks are a plurality of molded-in storage bins 5 that are sized and shaped for storage of specific tools typically used in termite control applications, such as hammerdrills, concrete materials, spray guns, etc. Thus, equipment utilized by termite control personnel can be carried in the module in a neat and orderly manner. A door 7 on the back of one of the topper halves 1a, 1b and pivotable relative thereto permits access to and operation of the hose reel, assembly of the fluid dispensing system without opening the gull wing doors 6a, 6b. In the preferred embodiment, the door 7 is on the back of topper half 1b. Suitable locking mechanisms are provided on the gull wing doors 6a, 6b and the door 7 to permit the doors to be locked.

Figure 12:
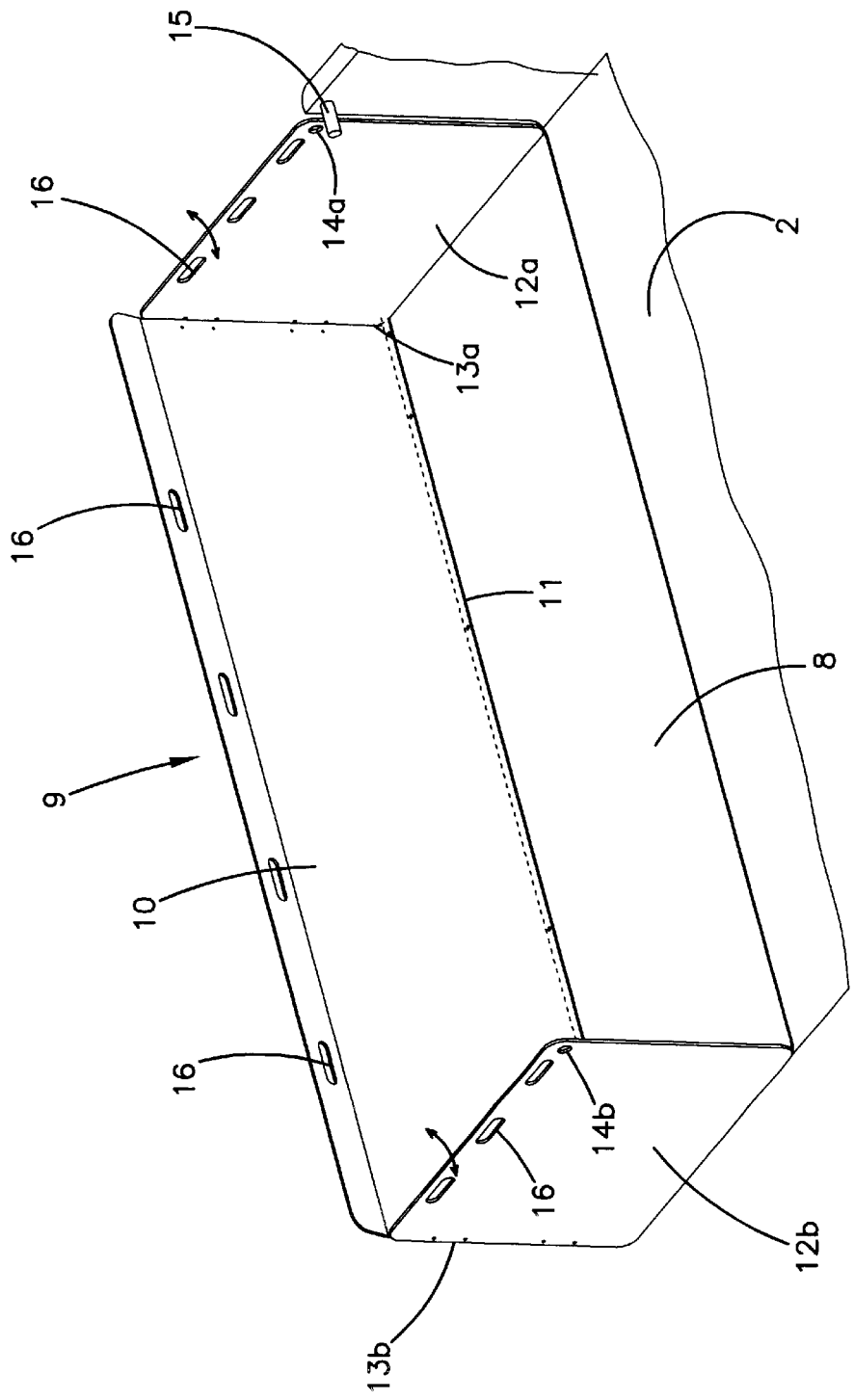
FIG. 12 illustrates the rear end of a pickup truck with a truck box extender assembly.

Mounted on the tailgate 8 of the truck box 2 is a truck box extender assembly 9, best seen in FIG. 12. The extender assembly 9 allows the tailgate 8 to be opened and used as extra truck box space for extra tools and for carrying extra materials away from a work site. The assembly 9 includes a rectangular rear panel 10 that is connected by a hinge 11 adjacent to the end of the tailgate 8. A pair of rectangular side panels 12a, 12b are connected by hinges 13a, 13b, respectively, at their rear edges to the rear panel 10. The bottom edges of the side panels 12a, 12b are not connected to the tailgate 8 so that the side panels 12a, 12b are able to swing about the axis of the hinges 13a, 13b as shown by the arrows in FIG. 12 between a position extending generally perpendicular to the rear panel 10 and a position at which the panels 12a, 12b lay flat against the panel 10 generally parallel thereto. Further, the hinge 11 allows the panel 10 to swing between a vertical orientation shown in FIG. 12 and an orientation at which the panel 10 lays flat against the tailgate 8 generally parallel thereto. Therefore, the assembly 9 can be broken down from the orientation shown in FIG. 12 by folding the side panels 12a, 12b flat against the rear panel 10 and folding the rear panel 10 down against the tailgate 8, which traps the side panels between the panel 10 and the tailgate 8. When the tailgate 8 is swung upward to a closed position, gravity keeps the panel 10 folded flat against the tailgate.

Each side panel 12a, 12b is provided with an aperture 14a, 14b adjacent the top of the front edge thereof. The apertures 14a, 14b are sized to fit over gate posts 15 (only one gate post is shown in FIG. 12) at the rear of the truck box 2 that form part of the latch mechanism for securing the tailgate 8 in its closed, upright position. When the assembly 9 is unfolded, the side panels 12a, 12b are secured in position by sliding the apertures 14a, 14b over the gate posts 15. The rear panel 10 and side panels 12a, 12b are also provided with apertures 16 spaced along the upper edges thereof. The apertures 16 permit securement of a cargo net (not shown), or other suitable member, for retaining items within the extra cargo space defined by the assembly 9 and the tailgate 8.

Fluid Dispensing System

Figure 2:
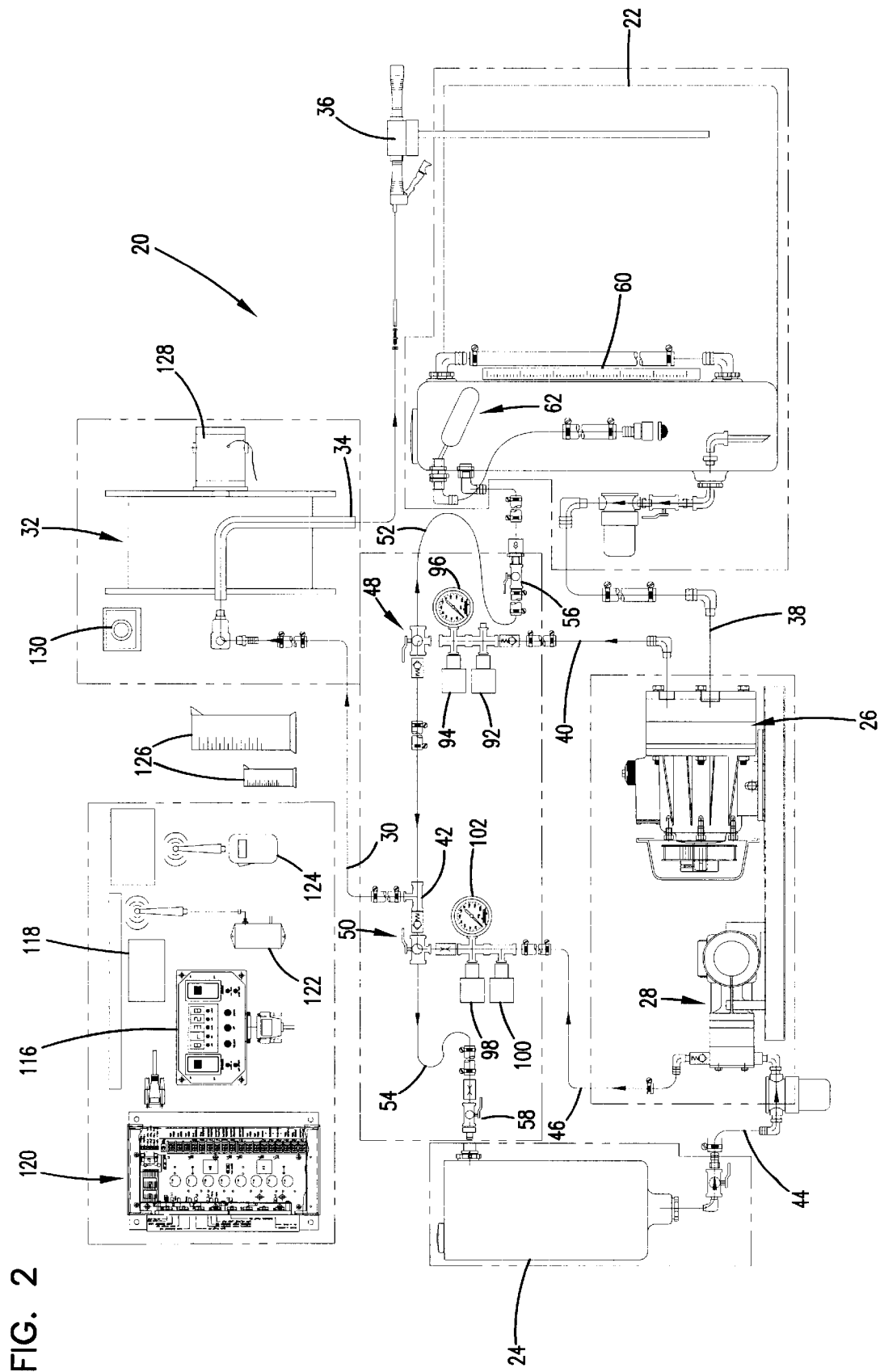
FIG. 2 schematically illustrates the fluid dispensing system of the invention.

With reference to FIG. 2, the fluid dispensing system 20 is illustrated. The system includes a fluid tank 22 and a fluid tank 24 that are covered by the topper halves 1a, 1b. The tank 22, which is larger than the tank 24, preferably holds water while the tank 24 preferably holds a suitable termiticide fluid chemical. A pump 26 is provided for pumping water from the tank 22 and a pump 28 pumps termiticide fluid from the tank 24. The water and termiticide that are pumped by the pumps 26, 28 mix within the line 30 which leads to a hose reel assembly 32. The mixed fluid flows into a hose 34 of the hose reel assembly 32 and to an injection gun 36 where the mixture is injected into the desired application holes or application areas.

Figure 6:
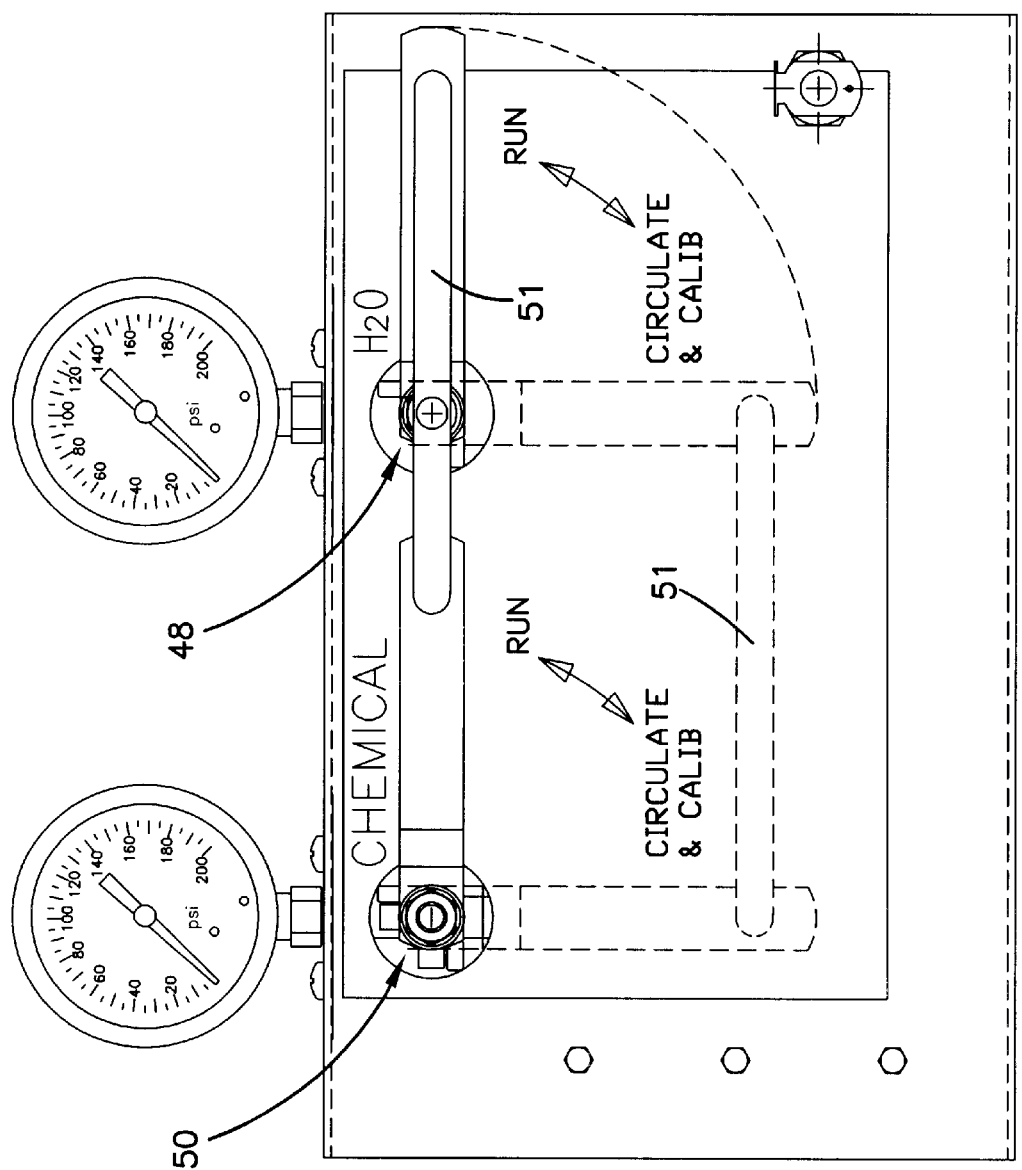
FIG. 6 illustrates the slaving of the flow control valves.

The inlet of the pump 26 is connected to the tank 22 through line 38, with the pump 26 discharging through line 40 which is connected to the line 30 via a juncture 42. Likewise, the inlet of the pump 28 is connected to the tank through line 44, with the pump 28 discharging though line 46 which is connected to the line 30 via the juncture 42. Flow through the lines 40, 46 to the juncture 42 is controlled by valves 48, 50, each of which has a run position, shown in FIG. 2, and a circulation position at which the water and termiticide are circulated back to the respective tanks 22, 24 through circulation lines 52, 54. The two valves 48, 50 are slaved together by linkage 51 as illustrated in FIG. 6 so that the valves are simultaneously actuated between the run and circulation positions, and to ensure that each valve is either in the run position or in the circulation position.

Returning to FIG. 2, flow through the circulation lines 52, 54 is controlled by valves 56, 58, respectively, which are connected to the respective tanks 22, 24 via quick connect/ disconnect couplings to permit a calibration procedure, to be later described. The circulation position of each valve 56, 58 also permits the pumps to pump their respective fluids back into the tanks 22, 24 which purges air out of the system. In addition, the tank 22 is provided with a water level gauge 60 which provides an indication of water level in the tank 22, as well as a float valve 62 to prevent overfilling of the tank 22.

In the preferred embodiment, the pump 26 is a positive displacement pump that displaces a known, discrete volume of fluid every cycle which is required for achieving metering. A suitable positive displacement pump is a Wanner Hydra-Cell D10 series pump, manufactured by Wanner Engineering of Minneapolis, Minn.

Figure 3:
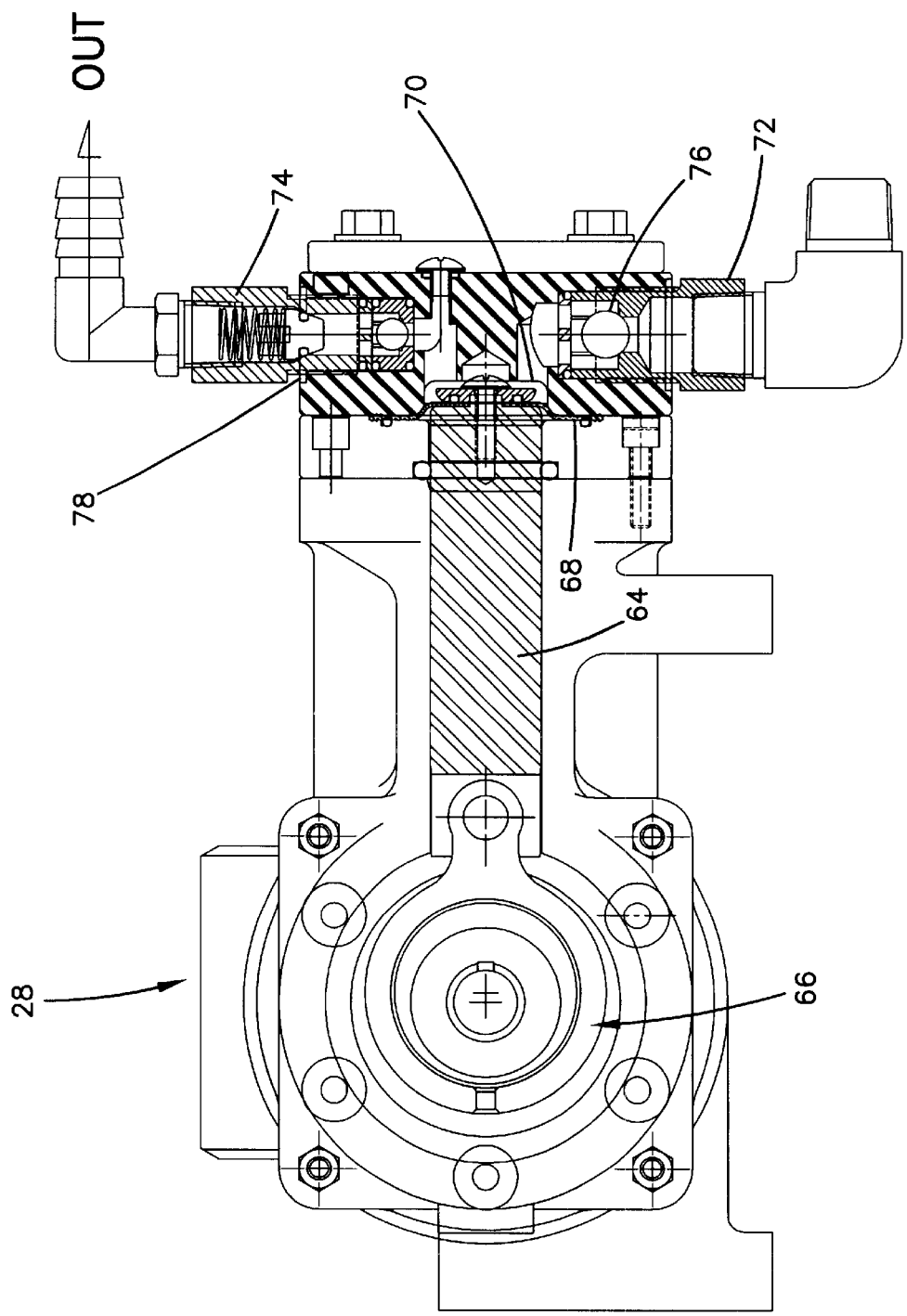
FIG. 3 illustrates details of the chemical meter pump.

The pump 28 is also preferably a positive displacement pump. Details of the pump 28 are illustrated in FIG. 3. The pump 28 is designed to displace very small increments of termiticide fluid so as to permit a wide range of mixing ratios of water/termiticide to be achieved. With reference to FIG. 3, the pump 28 includes a piston 64 that is driven by an eccentric drive mechanism 66 of a type known in the art. A diaphragm 68 separates the piston 64 from a pumping chamber 70 which is minimized to reduce volume compressibility errors. The pump 28 further includes an inlet 72 that is connected to the line 44 and an outlet 74 that connects to the line 46. An inlet check valve assembly 76 associated with the inlet 72, and an outlet check valve assembly 78 associated with the outlet 74, are preferably positioned close to the chamber 70 to maximize compression or displacement ratio.

Figure 4:
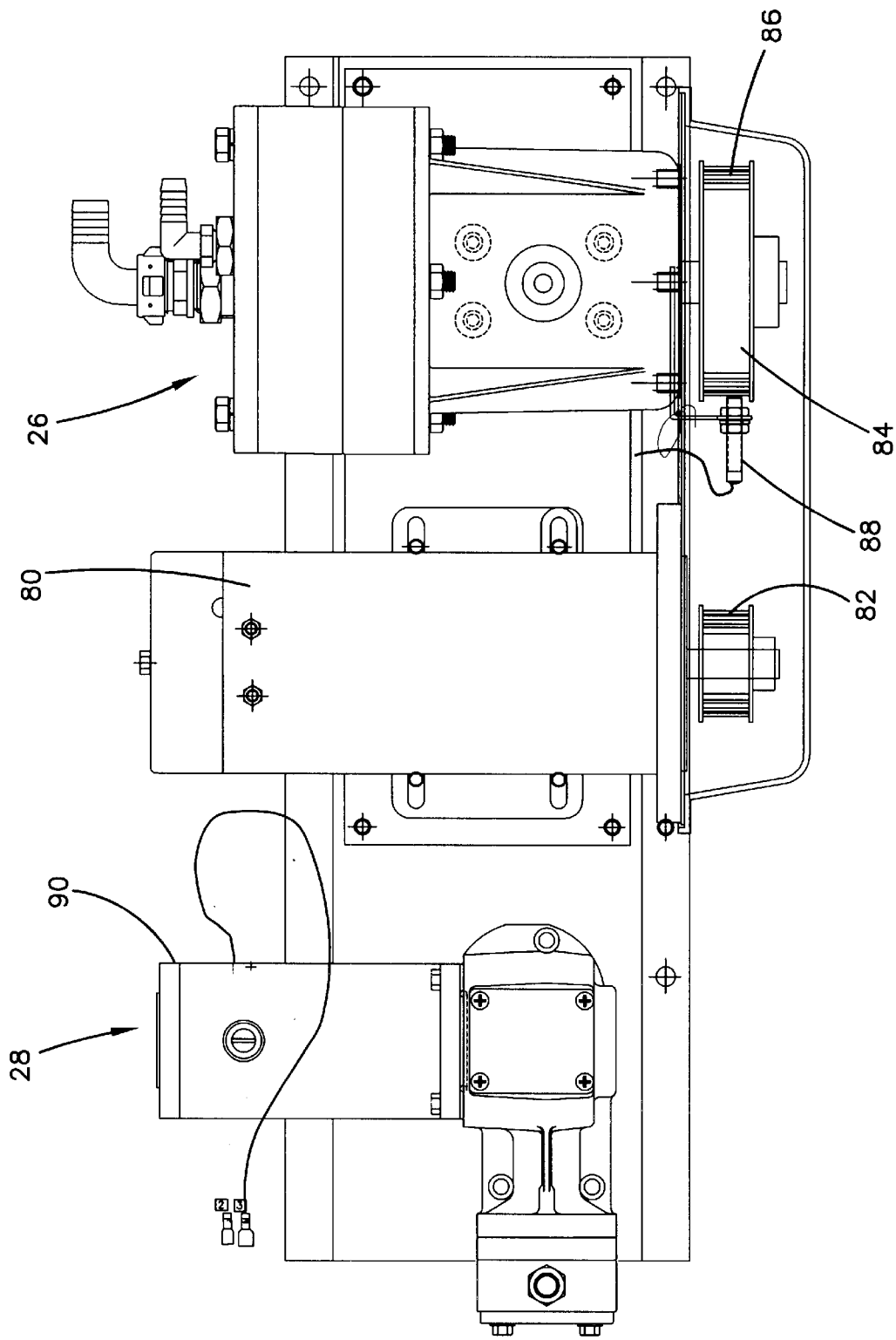
FIG. 4 illustrates the chemical and water meter pumps, and the mechanisms for sensing pump revolutions.

Each pump 26, 28 is also provided with means for sensing pump cycles. Because a determined amount of fluid is displaced each pump cycle, a measure of pump cycles provides an indication of the total amount of fluid displaced. With reference to FIG. 4, the two pumps 26, 28 are illustrated in a top view. A motor 80 is provided for driving the pump 26. The motor 80 drives a toothed pulley 82 which in turn drives a toothed gear 84 of the pump 26 through a suitable belt. The gear 84 is provided with circumferentially spaced teeth 86 that are sensed by an inductive proximity sensor 88 suitably mounted on the pump 26. In the preferred embodiment, forty teeth 86 are provided on the gear 84, so that when the sensor 88 senses forty teeth, one revolution of the pump 26 has occurred. The pump 28 is driven by a motor 90 that has an integral encoder associated therewith. A suitable motor and encoder arrangement is model 3B-1205042D manufactured by Minnesota Electric Technology, of Mankato, Minn. The number of revolutions of the motor, as sensed by the encoder, provides a measure of the volume of fluid that has been pumped. The outputs of the sensor 88 and the encoder are provided to a control pendent, to be later described, to track the amount of fluid displaced by each pump based on the readings provided by the sensor and encoder. The means for sensing pump cycles of the pumps 26, 28 described herein are exemplary only. Other sensing means could also be used. Moreover, the number of teeth 86 on the gear 84 and the specific encoder referenced herein are exemplary only.

Returning to FIG. 2, it is seen that high and low limit pressure switches 92, 94, and a gauge 96 are provided in the line 40 for the water pump 26. Likewise, a high limit pressure switch 98, a low flow switch 100 and a gauge 102 are provided in the line 46 for the termiticide pump 28. The switches 92, 94, 98, 100, which are connected to the system controller, ensure that the pumps 26, 28 are operating between minimum and maximum output pressures. The gauges 96, 102 visually display the output pressures of the respective pumps 26, 28. Pressure switches, in general, are well known in the art.

Figure 5:
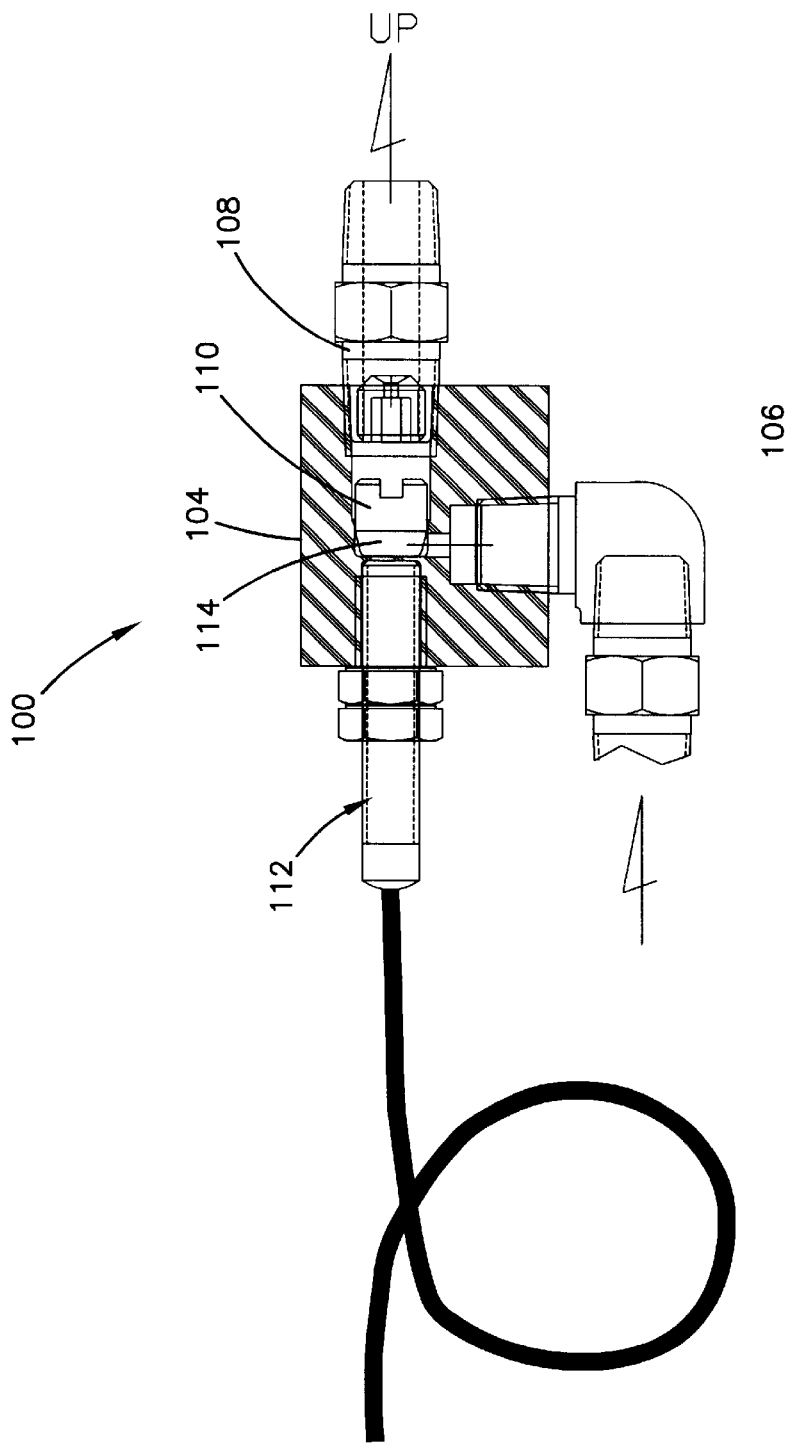
FIG. 5 illustrates a flow switch that is used on the output of the chemical meter pump.

The low limit water pressure switch 94 is used to indirectly detect flow from the water pump. However, due to the small flow rate of the pump 28, the low flow switch 100 must be designed to be capable of sensing the low flow rates of the pump 28. The low flow switch 100 need only indicate whether flow occurs or not—if no flow occurs, a problem with the pump 28 would be indicated. FIG. 5 illustrates the low flow switch 100 in detail. The switch 100 includes a housing 104 having an inlet 106 and an outlet 108. The housing 104 is constructed from a non-conductive material, such as plastic. A poppet 110 is slidably disposed within a channel formed in the housing 104. The poppet 110 is formed from a metal material, such as stainless steel. An inductive proximity sensor 112, which is connected to the system controller, is fixed to the housing 104 for sensing the position of the poppet 110 in the housing. The poppet 110 includes an angled end 114 facing the proximity sensor and adjacent the inlet 106, and at least one channel is provided around or through the poppet to permit fluid to flow past the poppet and to the outlet 108. The angled end 114 and poppet 110 are such that any flow through the inlet 106 forces the poppet away from the sensor 112 and to a position allowing flow through the switch 100. If there is no flow, the poppet 110 will fall back in proximity to the sensor 112, thereby indicating that no flow is occurring. The low flow switch 100 needs to be mounted in an orientation that would permit gravity to force the poppet back toward the sensor 112 when no flow occurs.

Additional elements of the system are illustrated in FIG. 2 and include a control pendant 116 that controls the system and records the performance thereof, an on/off power switch 118 for turning the system on and off, a system drive board 120, a radio transmitter 122 and radio receiver 124, and beakers 126 for performing a calibration of the system. In the preferred embodiment, the power switch 118 and system drive board 120 are fixedly mounted within the cab 4 of the truck 3, and the pendant 116 is located within the cab 4 where it is readily accessible by the operator for control inputs as well as to display system information.

System Control and Electronics

Figure 7:
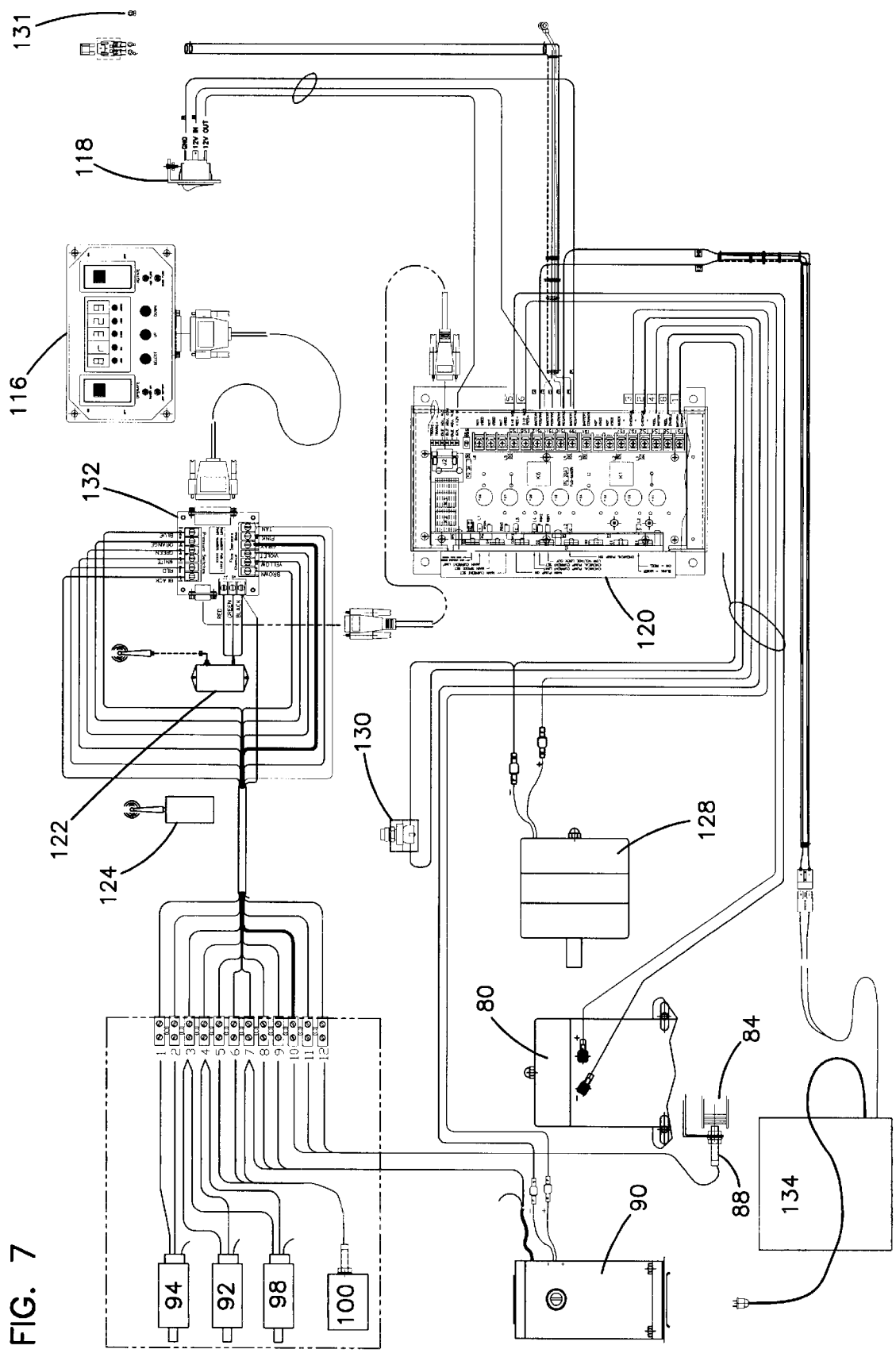
FIG. 7 illustrate the connection of the electrical components of the system.

FIG. 7 illustrates the connection between electrical components within the module 1 in the back of the truck 3 and the electrical components within the cab 4 of the truck. The system drive board 120, which is mounted within the cab 4, preferably behind the seats, is electrically connected to the motors 80, 90 that drive the pumps 26, 28 for controlling the operation thereof. In addition, a motor 128 for driving the hose reel assembly 32 is also electrically connected to the system drive board 120. A push button switch 130 that is mounted within the module 1 and is accessible through the door 7 controls operation of the motor 128. The power switch 118 electrically connects to the system drive board 120 and controls flow of electrical power to the system drive board 120 and the remainder of the electrical components. Electrical power to operate the termite control system of the invention is provided by the truck's electrical power system, specifically the truck's battery, through a connection to the battery feed in the fusebox 131. Since electrical power is provided by the vehicle's electrical power system, the use of separate power sources, such as electrical generators, gas engines and PTO drives, is eliminated. In contrast, some current systems use gas engine powered driven pumps, thereby creating gasoline handling/hauling hazards and burn hazards, and creating increased noise, equipment life and reliability problems. Powering a fluid dispensing system through the electrical system of a vehicle is known from copending U.S. application Ser. No. 09/025,523 (now U.S. Pat. No. 6,164,560), which is incorporated herein by reference.

The termite control system can also include an optional battery charger 134. The termite control may run from the battery charger 134, as well as with vehicle running. The termite control system may also run off of the vehicle battery, without the vehicle running, for short periods.

A junction 132 is also mounted within the cab 4. The switches 92, 94, 98, 100 are electrically connected to the junction 132 which in turn is electrically connected to the system drive board 120. Further, the output from the proximity sensor 88 associated with the pump 26 and the output from the encoder associated with the motor 90 feed into the junction 132. The control pendent 116 also electrically connects to the junction 132, and electrical signals for the radio transmitter 122 are sent through the junction 132 and are received by the radio receiver 124.

Figure 8:
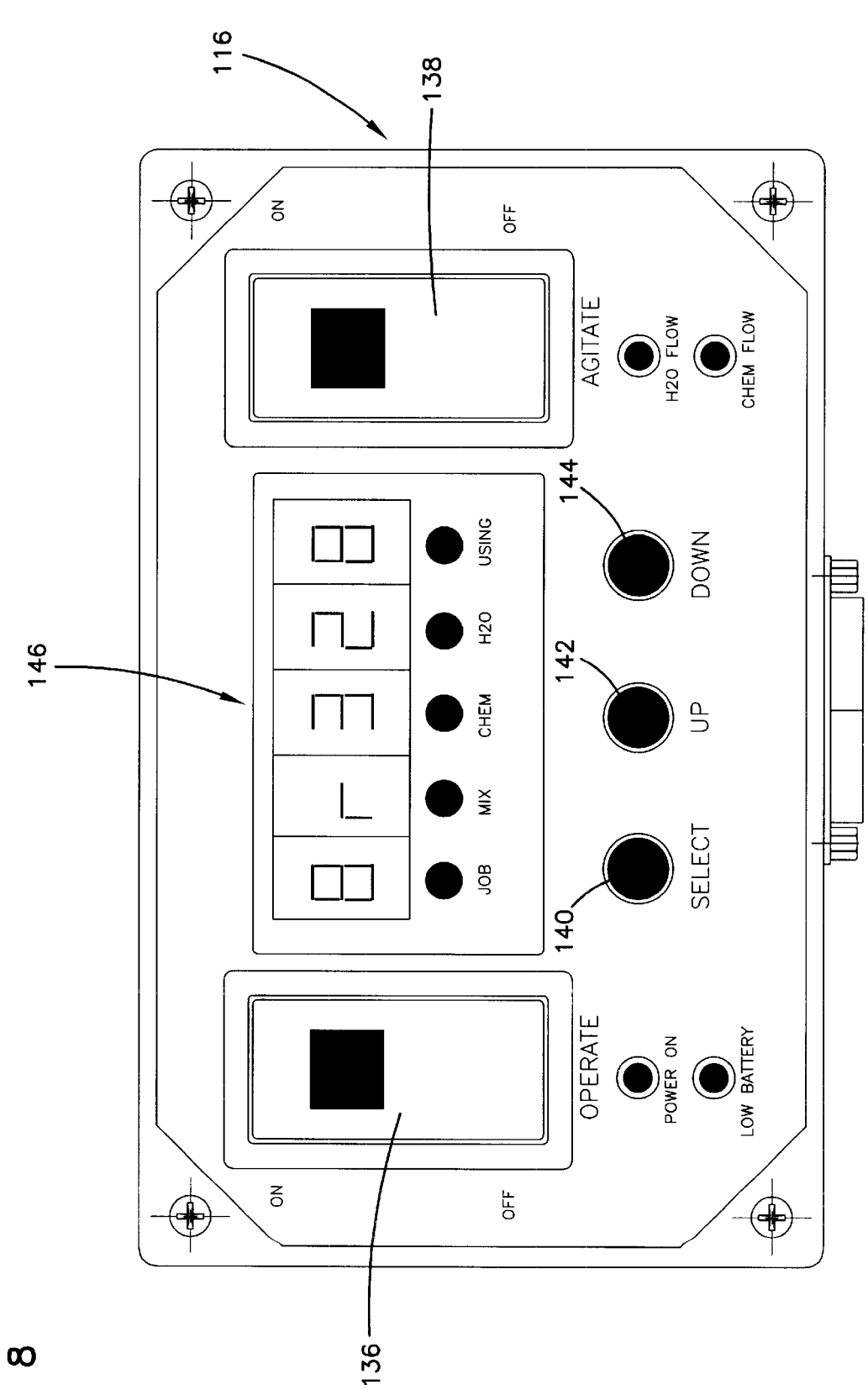
FIG. 8 illustrates the control pendent of the system.

FIG. 8 illustrates the control pendent 116 in detail, and FIGS. 9A–D illustrate various subcircuits within the control pendent. The control pendent 116 is designed to perform computer functions and operates as the operator controller for the termite control system. A variety of operator inputs can be input into the pendent 116 to change operation of the termite control system as well as to access and display operation information of the termite control system that has been tracked and compiled by the pendent. The pendent 116 also receives inputs from the sensor 88 and the encoder on the motor 90 for implementing the proportion metering and batch signal metering concepts.

Figure 9A:
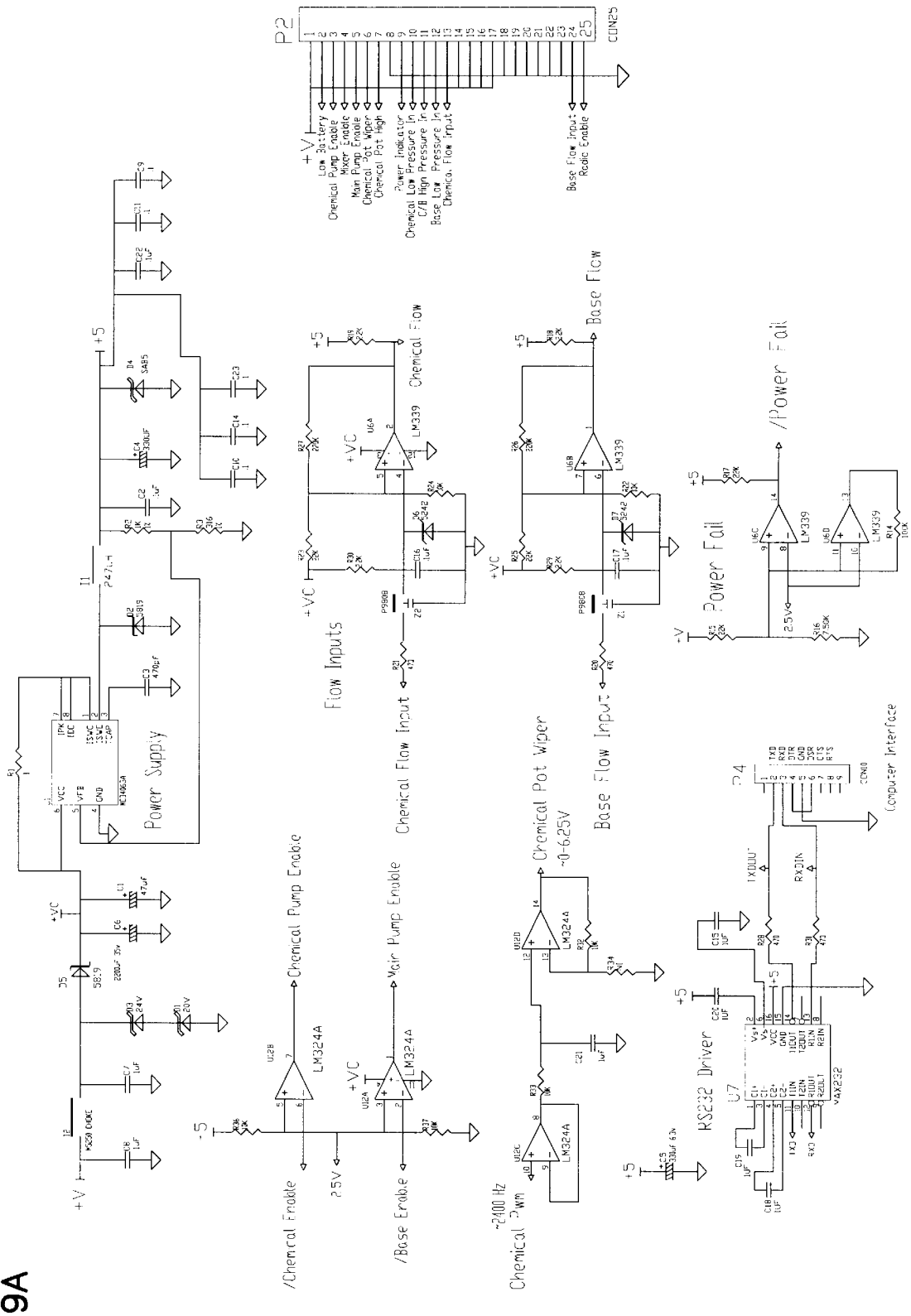
FIGS. 9A–D illustrate subcircuits within the control pendent.
Figure 9B:
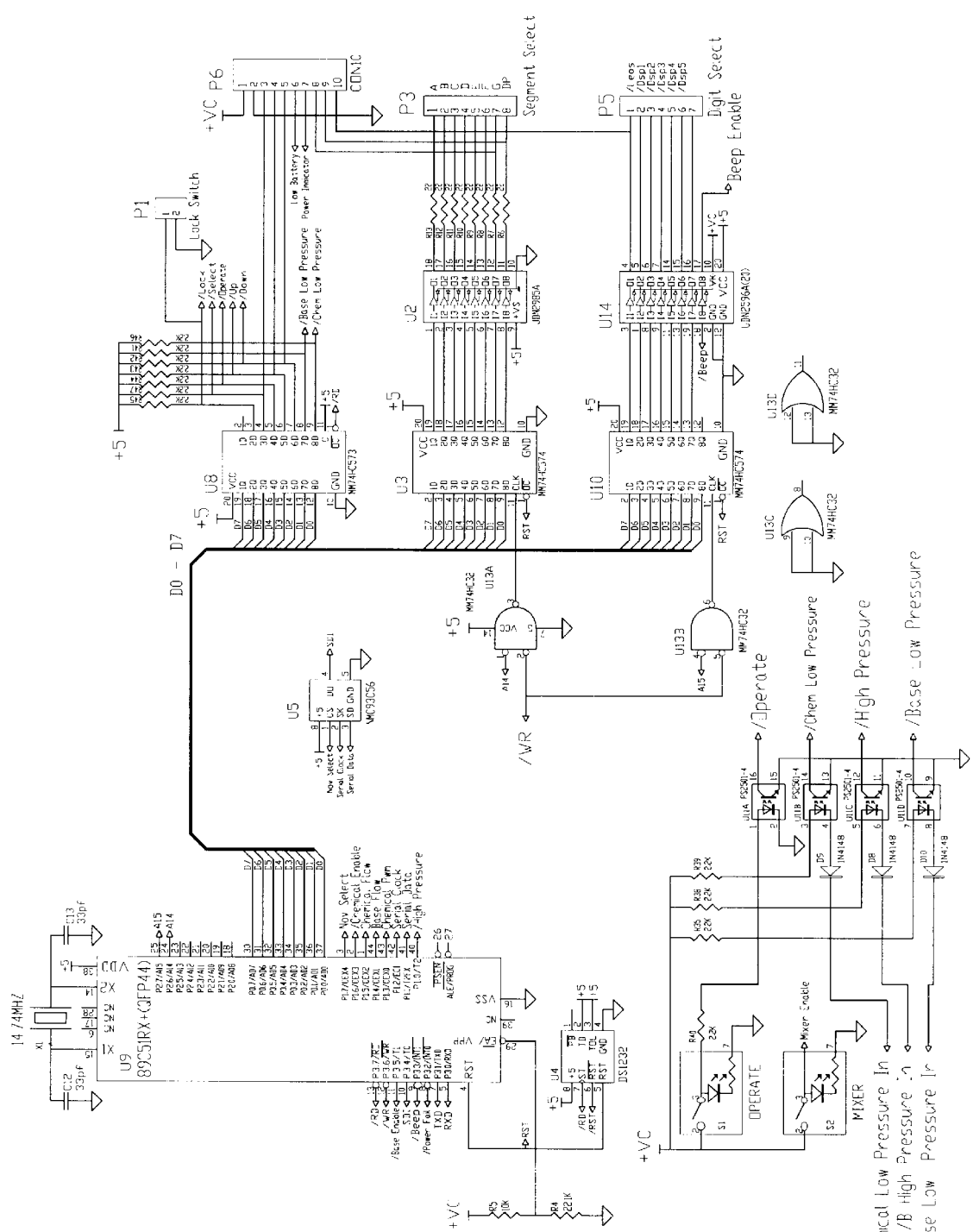
Figure 9D:
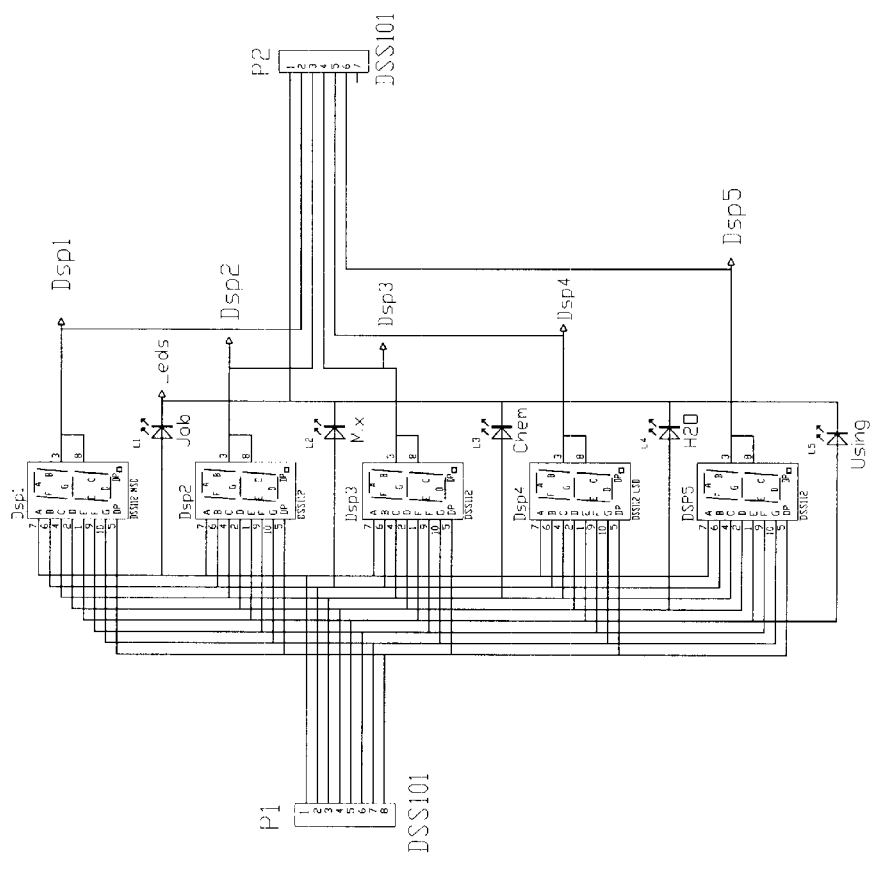
Figure 9C:
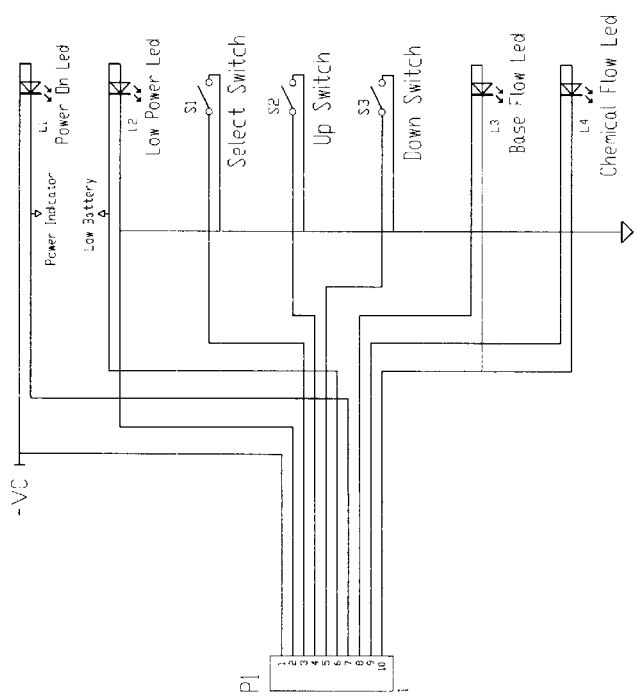

The pendent 116 includes an on/off switch 136 that operates certain features of the system, such as running the pumps during recirculation or calibration, and controls certain operations of the pendent itself. The pendent 116 further includes an on/off switch 138 for an agitator when an agitator is used in the chemical tank 24. The pendent 116 also includes control switches 140, 142, 144 for adjusting the functions of the pendent 116, and a five character display 146 that is capable of displaying operational and user information. A plurality of LED indicators on the pendent provide information on various operating states of the termite control system. FIG. 9A illustrates pendent power control circuitry, FIG. 9B illustrates pendent logic circuitry, FIG. 9C illustrates the pendent switch circuitry, and FIG. 9D illustrates the pendent character display circuitry.

Figure 10A:
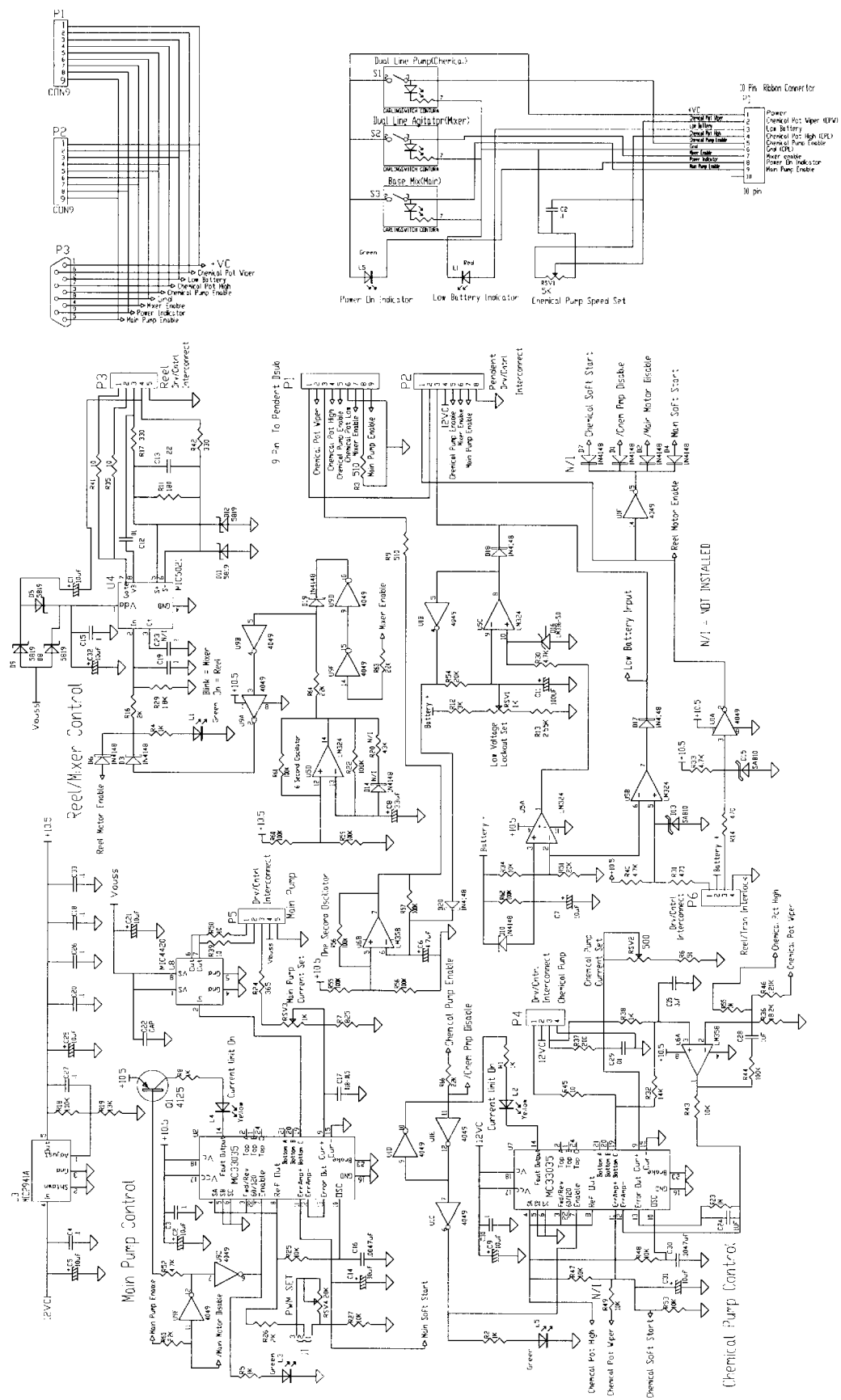
FIG. 10A illustrates the drive control logic circuitry on the drive control board of the system drive board.
Figure 10B:
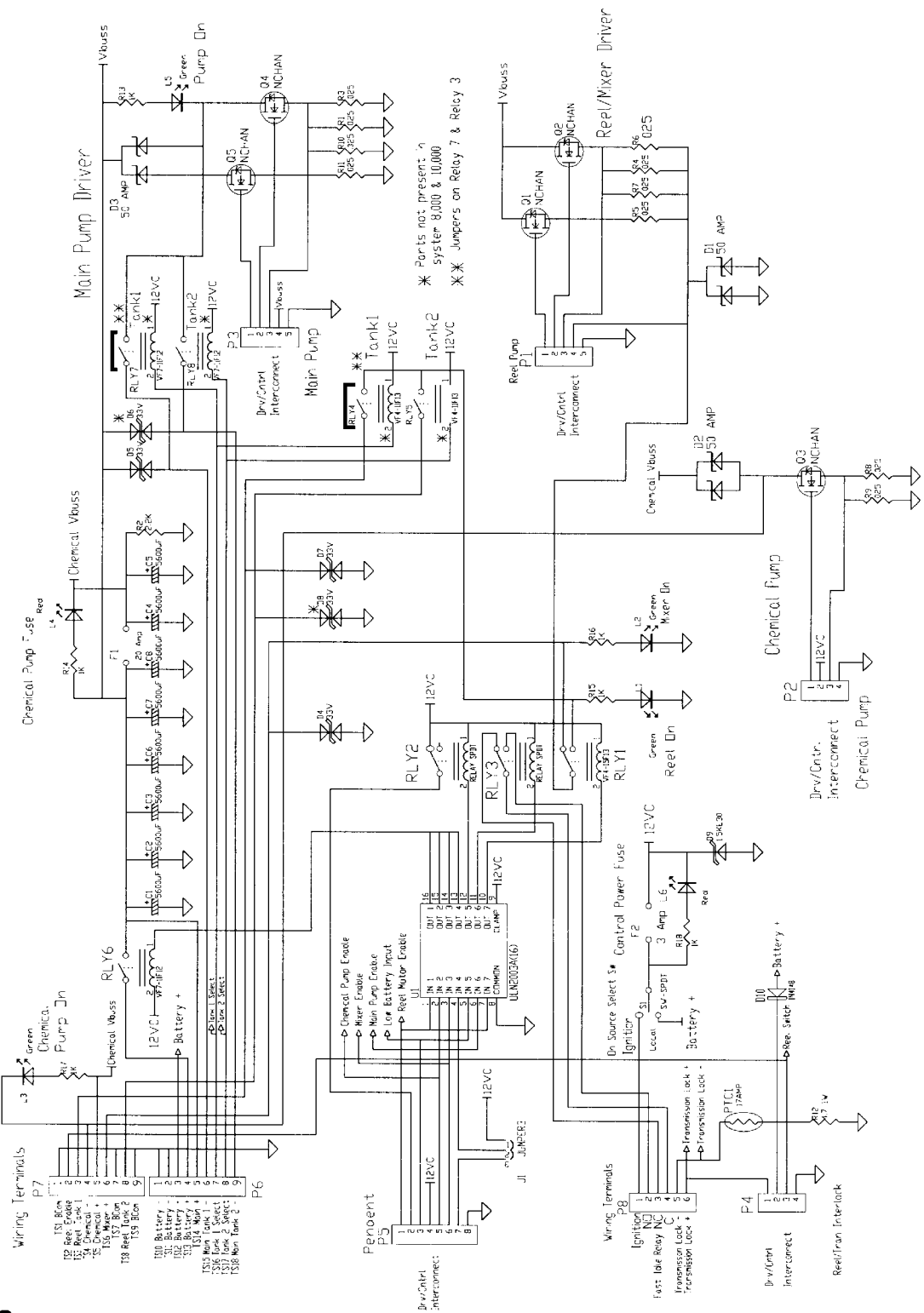
FIG. 10B illustrates the power control circuitry on the drive power board of the system drive board.

The circuitry on the system drive board 120 is illustrated in FIGS. 10A and 10B, with FIG. 10A illustrating the drive control logic circuitry on the drive control board, and FIG. 10B illustrating the power control circuitry on the drive power board. These figures call out "DI0" pump or "main pump" which refer to the waterpump 26 and its motor 80. Further details on the drive control logic circuitry of FIG. 10A can be found from U.S. application Ser. No. 09/025,523 (now U.S. Pat. No. 6,164,560), incorporated herein by reference.

Component Operation a) Water Pump 26 and Motor 80 Control

The pump 26 is gravity fed from the tank 22. The pump can be activated only when the switch 136 on the pendent 116 is "on". When running a fluid dispensing job, the select switch 140 needs to be pushed while the switch 136 is "on" to activate the pump 26 as well as the pump 28. Activating the switch 136 to "off" shuts the pumps 26, 28 off. A "on" indicator on the pendent 116 lights to indicate when the pump is activated. The pump 26 and pump 28 are mini-batch-slaved together to achieve proportioning of the water and termiticide, as will be described in more detail below. The drive control logic circuitry in FIG. 10A includes an adjustable 25–40 amp current limiting sub-circuit to adjust motor torque and thereby adjust fluid pressure. In addition, the drive control logic circuitry includes a reel motor interlock that turns the pump 26 off when the reel motor 128 is turned on. Further information on the current limiting sub-circuit and the reel motor interlock can be found in U.S. application Ser. No. 09/025,523 (now U.S. Pat. No. 6,164,560).

b) Chemical Pump 28 and Motor 90 Control

The pump 28 is enabled when the pump 26 is "on". The drive control logic circuitry includes a current limiting sub-circuit for the pump 28 to limit motor torque and thereby limit fluid pressure. Further information on the current limiting subcircuit can be found in U.S. application Ser. No. 09/025,523 (now U.S. Pat. No. 6,164,560). The pendent 116 turns the motor 90 on/off based on pulses received from the encoder in the motor 90, and adjust motor voltage, thereby adjusting motor speed and thus the fluid flow rate, so as to hold fluid output volume and time proportionally relative to the pump 26, as will be described in more detail below. The reel motor interlock described above for pump 26 also turns off the pump 28 when the reel motor 128 is turned on.

c) Hose Reel Assembly 32 and Hose Reel Motor 128 Control

The motor 128 is turned on by the push-button switch 130 located near the door 7 on the module 1. The power control circuitry includes current limiting, preferably 34 amp current limiting, to adjust motor torque, and thereby control reel retract force, as described in U.S. application Ser. No. 09/025,523 (now U.S. Pat. No. 6,164,560).

d) Pendent 116 and Pendent Logic Circuitry

The pendent logic circuitry of FIG. 9B provides adjustable proportioning control of the water and termiticide, adjustable shot size metering signals to the radio receiver 124, tracks individual job totals which are displayed via the display 146, tracks running totals of amounts of water and termiticide dispensed, tracks a particular job number which can be displayed, tracks the type of termiticide fluid used, and tracks termiticide mix ratios. In addition, the pendent logic circuitry counts pulses that are received from the sensor 88 and the encoder on the motor 90, and utilizes the counted pulses to achieve the proportioning control.

Proportion Metering and Batch Signal Generation

Figure 11:
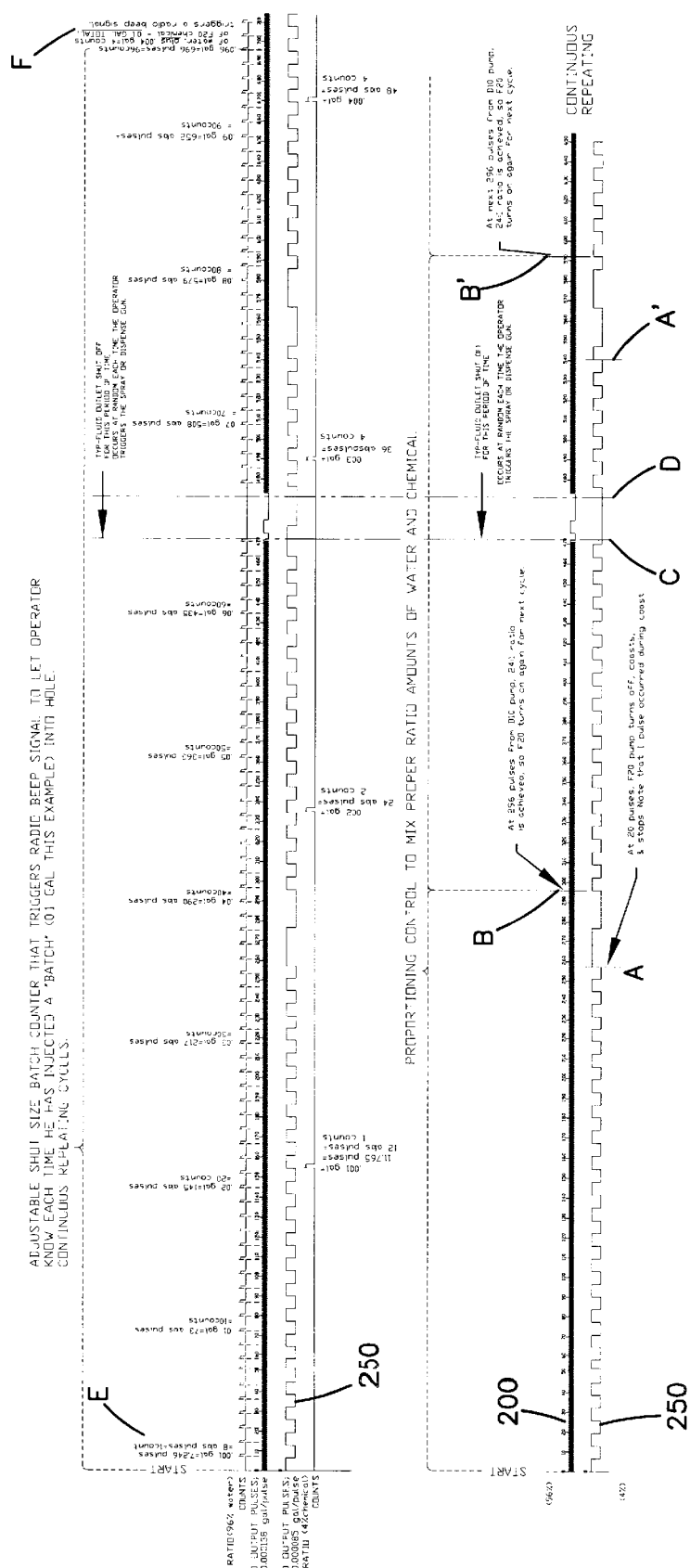
FIG. 11 illustrates the concepts of proportioning metering and batch signal metering according to the invention.

The concepts of proportion metering of the water from the pump 26 and the termiticide fluid from the pump 28, and the generation of batch signals are illustrated in FIG. 11. In the figure, D10 refers to the water pump 26 while F20 refers to the termiticide pump 28. The bottom portion of the figure represents the process of proportion metering to achieve the proper mix ratio of water and termiticide prior to the mixture being dispensed into the application hole. The top portion of the figure represents the process of generating batch signals that are sent by the radio transmitter 122 and received by the radio receiver 124 carried by the system operator. The batch signals provide an audible signal to let the operator know each time a predetermined batch (i.e. amount) of mixture is injected into the application hole or area. In order to describe these concepts, exemplary values have been used for the variables such as the mix ratio, the amount of fluid in a batch, the number of signal pulses per revolution of the pumps, the amount of fluid output by the pumps per pulse signal, etc. The exemplary values are for sake of convenience in describing the invention, and are not to be construed as limiting the invention in any manner.

Two waveforms are illustrated in FIG. 11, one waveform 200 representing the output pulses from the proximity sensor 88 of the pump 26 and the second waveform 250 representing the output pulses from the encoder of the pump 28. As described earlier, in the preferred embodiment, there are forty teeth 86 on the gear 84 so that for every revolution of the pump 26, forty electrical signal pulses are generated by the sensor 88. The encoder associated with the pump 28, in the preferred embodiment, preferably outputs four electrical signal pulses per revolution of the pump. Further, each pump displaces or outputs a known amount of fluid each pump cycle, based upon the design of the pump. Because the number of signal pulses and the amount of fluid output by each pump is known, the amount of fluid displaced for every pulse signal can be determined. In the preferred embodiment, the pump 26 outputs nominally 0.000138 gallon of fluid per pulse signal, while the pump 28 outputs nominally 0.000085 gallon of fluid per pulse signal.

Proportion metering is used to assure that the correct volume of water is mixed with the correct volume of termiticide fluid. As described earlier, a commonly used proportioning technique is to utilize a master-slave system with one pump "slaved" to the other. However, this previous technique produces errors at each start and stop of the pumps, with these errors eventually accumulating into large errors. Attempts to minimize these errors create instability in the system. The proportion metering of the invention eliminates the accumulated error and instability by making discrete "mini-batches" that are absolute. This is accomplished by repeatedly pumping the correct volumes of each fluid together in small batches that are then mixed in the line 30 and in the hose 34.

For example, using twenty pulses from the pump 28 as the basis for each proportioning cycle (i.e. mini-batch), and assuming a 24:1 mixing ratio between water and termiticide, provides:

20 pulses×0.000085 gal/pulse=0.0017 gal. of termiticide 24 gal. of water/gal. of termiticide×0.0017 gal. of termiticide= 0.0408 gal. of water For the pump 26, the output per pulse is 0.000138 gallon. Therefore, 0.0408/0.000138=296 pulses are required from the pump 26 per proportioning cycle. When the pump 28 completes twenty pulses (point A in FIG. 11), it stops and waits for the pump 26 to complete its 296 pulses (point B). The stopping of the pump 28 is performed by the pendent 116. Twenty pulses of the pump 28 is an arbitrary number that trades off small batch volume with good accuracy. Too large a batch would not allow proper mixing in the line 30 and hose 34.

As implied in FIG. 11, the pump 28 may coast slightly (point A to point B) while it waits for the pump 26 to complete its pulses. Any pulses that are generated while the pump 28 coasts are included in the next proportioning cycle. Therefore, as shown in FIG. 11, if one pulse occurs during coast, that one pulse counts as the first pulse for the next twenty pulses of the pump 28. By including coast pulses in the next cycle, accumulated errors are eliminated. Further, the logic circuitry of the pendent notes the time delay between the pump 28 finishing its twenty pulses and the pump 26 finishing its 296 pulses, and modifies the speed of the pump 28 to minimize this time difference for the next cycle. Once the pump 26 completes its pulses (point B), the pump 28 is turned back on to begin the next cycle.

FIG. 11 also illustrates what happens when the operator triggers the injection gun 36. Point C is the point at which the gun 36 is shut off for a period of time up to point D where the gun 36 is again triggered. When the gun 36 is shut off at point C, the pumps 26, 28 are shut off due to a rapid rise in pressure sensed by the pressure switches 92, 98 which communicate back to the pendent 116 to shut the pumps off. During this shut off time, any pulses generated by coasting of the pumps 26, 28 are counted in the current cycle. When the gun 36 is again triggered (point D), the pumps 26, 28 turn back on and the cycle continues until the pump 28 again reaches twenty pulses (point A') and the pump 26 reaches 296 pulses (point B'). These cycles repeat continuously, with each mini-batch having the proper mix ratio.

This proportion metering concept has applications in other industries that separately pump fluids that are then to be mixed within the flow lines prior to dispensing. For example, different colors can be blended at certain mixing ratios to create dyes, paints, etc. Personal care products, such as lotions, soaps, shampoos and the like, that are created from a mixture of fluids can be proportion metered using the inventive concept. Other applications will be apparent to persons having ordinary skill in the art.

Turning to the top half of FIG. 11, batch signal metering of the invention is illustrated. A batch signal is created each time a preselected amount of mixture has been injected. To aid in explaining this concept, it will be assumed that the preselected amount of mixture (i.e. each batch) is 0.1 gal. The pulses from each pump are converted into 0.01 gallon increments, which in turn are converted into absolute pulses which are then converted into counts, by the pendent 116. The pendent 116 tracks the number of counts of both pumps 26, 28 to determine when a batch has been injected.

The use of counts is a more reliable method of tracking the amount of mixture injected due to the problem of fractional pulses. As shown at point E, in order for the pump 26 to displace 0.01 gal., 7.246 pulses are necessary. To actually displace 0.01 gal., 8 absolute pulses are required, because 7 pulses would not result in sufficient fluid displacement. However, 8 pulses displaces more fluid than required. This problem is resolved by scaling the units as shown in the top half of FIG. 11, so that every 0.01 gallon increment equals 1 count.

Therefore, using the exemplary batch amount of 0.1 gal., an audible batch signal is generated each time a total of 0.096 gal=696 pulses=96 counts of water plus 0.004 gal=4 counts of termiticide is reached (see point F). The audible signal is triggered in the receiver 124 carried by the operator each time that 0.1 gal is dispensed. If 0.3 gallons per hole is required, three audible tones would occur, letting the operator know that the proper amount has been injected into the hole. This is particularly desirable for blind application holes, because the operator knows by the signals how much fluid has been injected into each blind hole.

The amount of fluid required to trigger the batch signal is changeable via the operator through the pendent 116. In addition, the mixing ratio can also be changed via the pendent. The mixing ratio selected will be based upon the particular termiticide fluid being used. The pendent 116 is preferably designed to store the mixing ratios for commonly used termiticide fluids, as well as allow the mixing ratios to be changed.

It was discussed above that the amount of fluid that is output by each pump 26, 28 is known. However, the exact amount of fluid that is output actually varies over time. Therefore, periodic calibration of the amount of fluid output from each pump is necessary. Calibration is performed using the beakers 126, one for water and one for termiticide fluid. For instance, to calibrate the water pump 26, a one gallon sample of water is taken. The sample is taken by closing the valve 56, disconnecting the coupling that couples the line to the tank 22, re-opening the valve 56 and filling the largest beaker with one gallon of water. The pendent 116, which knows how much water should have been output based on the number of pulses times 0.000138 gallon of fluid per pulse signal, displays a dispensed amount. If the displayed amount is different than the amount discharged into the beaker, the gallon per pulse quantity stored in the pendent 116 must be altered. For instance, if the pendent displays 1.2 gal., but the sample in the beaker is 1.0 gal., the displayed 1.2 gal. is moved down to 1.0 gal. This changes the gallon per pulse value stored in the pendent by the ratio 1.2/1.0 or 1.2. The previous gallon per pulse factor, i.e. 0.000138 gallon of fluid per pulse signal, will be automatically multiplied by 1.2 to now equal 0.0001656 gallon of fluid per pulse signal, which replaces the previous factor in the algorithm. The calibration that is performed for the pump 28 is similar to the calibration for pump 26 and should not require further description.

The concept of generating an audible signal when discrete amounts of fluid have been dispensed is useful in any system where a system operator can apply the wrong amount of fluid by not knowing the amount of fluid that has been dispensed. It is impractical for an operator to watch a flowmeter while busy handling an application device, or while walking. It can be imagined that audible signalling is especially important when doing "blind" dispensing, such as applying pest control fluid down into a hole or applying beneficial root feeding fluids. Thus, the invention is not limited to the termite control industry. This concept can also be utilized in the lawn care industry to assure proper coverage of fertilizer and herbicides during lawn treatment procedures. This concept could also be used in any other industry that relies upon fluid application or dispensing and which would benefit by having operator feedback of the amount of fluid delivered. Further, while audible signals are preferred, other sensory signals could be generated. For example, visual or tactile signals could be generated in place of audible signals.

It is to be understood that while certain embodiments of the present invention have been illustrated and described, the invention is not limited to the specific forms or arrangements of parts described and shown.

What is claimed is:

1. A method of proportion metering first and second fluids that are output from first and second pumps, respectively, over a plurality of proportioning cycles to achieve a selected mix ratio, comprising:
    a) simultaneously operating the first and second pumps;
    b) monitoring the amounts of the first and second fluids output by the first and second pumps during each proportioning cycle, respectively; and
    c) stopping the first pump while the second pump continues operating until the selected mix ratio is achieved for a current proportioning cycle, and then restarting the first pump to begin the next proportioning cycle.

2. The method according to claim 1, wherein the step of monitoring comprises counting electrical pulses that are output from sensors associated with the first and second pumps, each pulse representative of an amount of fluid output by the respective first and second pump.

3. The method according to claim 2, wherein any pulses generated by the first pump after it is stopped are counted in the next proportioning cycle.

4. The method according to claim 1, further including monitoring the time delay between stopping the first pump and achieving the selected mix ratio, and modifying the speed of the first pump in the next proportioning cycle to minimize the time delay.

5. The method according to claim 1, wherein the first and second fluids are different fluids.

6. The method according to claim 5, wherein the first fluid is termiticide fluid and the second fluid is water.

7. The method according to claim 1, further including monitoring the total amounts of the first and second fluids output from the first and second pumps, and generating a sensory signal each time that the first and second pumps output a selected combined amount of the first and second fluids.

8. The method according to claim 7, wherein generating a sensory signal comprises generating an audible signal.

9. A method of proportion metering first and second fluids output from first and second pumps to achieve a predetermined mix ratio, comprising:
    pumping the first and second fluids in proportioning batches through operation of the first and second pumps, the ratio of the volumes of the first and second fluids in each proportioning batch equaling the predetermined mix ratio, and, wherein for each proportioning batch, operation of one of the first and second pumps is stopped.

10. A method of controlling first and second pumps that output first and second fluids, respectively, in order to blend the first and second fluids in a selected mix ratio, comprising:
    simultaneously operating the first and second pumps over a plurality of proportioning cycles to output the first and second fluids;
    monitoring the amounts of the first and second fluids output by the first and second pumps during each proportioning cycle;
    stopping operation of the first pump in each proportioning cycle while the second pump continues to operate, operation of the first pump being stopped each time the first pump outputs a selected amount of the first fluid; and
    restarting the first pump to begin the next proportioning cycle once the second pump has output enough of the second fluid in a current proportioning cycle to achieve the selected mix ratio.

11. The method according to claim 10, further including adding any fluid that is output by the first pump after it is stopped in each proportioning cycle to the next proportioning cycle.

12. A method of tracking the amount of fluid dispensed from a fluid dispensing system, comprising:
    selecting an incremental amount of fluid that is less than a total amount of fluid to be dispensed;
    electronically monitoring the amount of fluid being dispensed during dispensing, wherein monitoring occurs at a location remote from the location of dispensing the fluid; and
    electronically generating a sensory signal each time that the amount of fluid dispensed equals the incremental amount of fluid, wherein generation of the sensory signal occurs at a location remote from the monitoring.

13. The method according to claim 12, wherein the fluid dispensing system includes first and second pumps that pump first and second fluids, respectively; and wherein the incremental amount has a selected mix ratio between the first and second fluids.

14. The method according to claim 13, wherein electronically monitoring comprises electronically monitoring the revolutions of the first and second pumps.

15. The method according to claim 12, wherein the sensory signal comprises an audible signal.

16. A method of proportion metering first and second fluids output from first and second pumps to achieve a predetermined mix ratio in a fluid blend formed from the first and second fluids prior to dispensing a batch of the fluid blend, comprising:

pumping the first and second fluids in proportioning batches through operation of the first and second pumps, the ratio of the first and second fluids in each proportioning batch equaling the predetermined mix ratio, and the volume of the first and second fluids in each proportioning batch is small enough so that the dispensed batch comprises at least one of said proportioning batches.

17. The method of claim 16, wherein said dispensed batch comprises more than one of said proportioning batches.

18. A method of proportion metering first and second fluids output from first and second pumps to achieve a predetermined mix ratio in a fluid blend formed from the first and second fluids prior to dispensing a batch of the fluid blend, comprising:

pumping the first and second fluids in proportioning batches through operation of the first and second pumps, each proportioning batch comprising a proportioning batch volume that includes an amount of the first fluid and an amount of the second fluid, and wherein each proportioning batch volume is a fraction of the volume of the dispensed batch, whereby the dispensed batch comprises at least one said proportioning batch volume and the ratio of the first and second fluids in the dispensed batch equals the predetermined mix ratio.

19. The method of claim 18, wherein said dispensed batch comprises more than one of said proportioning batches.

* * * * *